United States Patent
Bossman et al.

(10) Patent No.: US 7,302,422 B2
(45) Date of Patent: Nov. 27, 2007

(54) QUERY WORKLOAD STATISTICS COLLECTION IN A DATABASE MANAGEMENT SYSTEM

(75) Inventors: Patrick Dooling Bossman, Alexandria, VA (US); You-Chin Fuh, San Jose, CA (US); Shuanglin Guo, San Jose, CA (US); Chan-Hua Liu, San Jose, CA (US); Yoichi Tsuji, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 445 days.

(21) Appl. No.: 10/824,856

(22) Filed: Apr. 14, 2004

(65) Prior Publication Data

US 2005/0234900 A1 Oct. 20, 2005

(51) Int. Cl.
*G06F 7/00* (2006.01)
*G06F 17/30* (2006.01)

(52) U.S. Cl. .............................................. 707/2; 707/4
(58) Field of Classification Search ................ None
See application file for complete search history.

(56) References Cited

U.S. PATENT DOCUMENTS

| | | | |
|---|---|---|---|
| 5,689,698 A | 11/1997 | Jones et al. .................. 395/604 |
| 5,754,841 A | 5/1998 | Cariño, Jr. .................. 395/603 |
| 5,794,250 A | 8/1998 | Cariño, Jr. et al. ........... 707/104 |
| 5,864,843 A | 1/1999 | Cariño, Jr. et al. ............ 707/4 |
| 5,873,083 A | 2/1999 | Jones et al. ..................... 707/4 |
| 5,899,986 A | 5/1999 | Ziauddin |
| 5,913,206 A | 6/1999 | Chaudhuri et al. ............ 707/2 |
| 5,913,207 A | 6/1999 | Chaudhuri et al. ............ 707/2 |
| 5,926,813 A | 7/1999 | Chaudhuri et al. ............ 707/5 |
| 5,930,786 A | 7/1999 | Cariño, Jr. et al. ............ 707/4 |
| 5,950,186 A | 9/1999 | Chaudhuri et al. ............ 707/2 |
| 6,023,695 A * | 2/2000 | Osborn et al. ................. 707/3 |
| 6,026,391 A * | 2/2000 | Osborn et al. ................. 707/2 |
| 6,085,223 A | 7/2000 | Cariño, Jr. et al. ......... 709/203 |
| 6,195,653 B1 | 2/2001 | Bleizeffer et al. .............. 707/2 |
| 6,243,703 B1 | 6/2001 | Couch et al. ................. 707/10 |
| 6,249,791 B1 * | 6/2001 | Osborn et al. ............. 707/200 |
| 6,351,742 B1 | 2/2002 | Agarwal et al. ................ 707/3 |
| 6,353,818 B1 | 3/2002 | Carino, Jr. ..................... 707/2 |

(Continued)

OTHER PUBLICATIONS

United States Patent Application title, "Method, System, and Program for Statistics Management," to Patrick Dooling Bossman, You-Chin Fuh, and Chan-Hua Liu, Filed Jan. 7, 2004, U.S. Appl. No. 10/752,915, IBM Docket No. SVL920030089US1.

(Continued)

*Primary Examiner*—Cam Y. Huong
*Assistant Examiner*—Thu-Nguyet Le
(74) *Attorney, Agent, or Firm*—Janet M. Skafar; Ingrid M. Foerster; Gregory M. Plow

(57) ABSTRACT

In various embodiments, a method, apparatus, and article of manufacture collect statistics in a database management system. A workload comprising a plurality of database queries is received. Query statistics for the database queries are identified. The query statistics for the database queries are consolidated to provide consolidated statistics. One or more statistics collection requests are generated based on the consolidated statistics.

20 Claims, 10 Drawing Sheets

U.S. PATENT DOCUMENTS

| | | | |
|---|---|---|---|
| 6,363,371 B1 | 3/2002 | Chaudhuri et al. | 707/2 |
| 6,366,901 B1 | 4/2002 | Ellis | 707/2 |
| 6,370,522 B1 | 4/2002 | Agarwal et al. | 707/2 |
| 6,370,523 B1 | 4/2002 | Anderson | 707/3 |
| 6,397,207 B1 | 5/2002 | Bleizeffer et al. | 707/2 |
| 6,401,083 B1 | 6/2002 | Agarwal et al. | 707/2 |
| 6,401,087 B2 | 6/2002 | Yanagimoto | 707/5 |
| 6,493,700 B2 | 12/2002 | Couch et al. | 707/2 |
| 6,529,901 B1 * | 3/2003 | Chaudhuri et al. | 707/3 |
| 6,539,371 B1 | 3/2003 | Bleizeffer et al. | 707/2 |
| 6,763,352 B2 * | 7/2004 | Cochrane et al. | 707/4 |
| 6,847,962 B1 * | 1/2005 | Cochrane et al. | 707/4 |
| 6,985,904 B1 * | 1/2006 | Kaluskar et al. | 707/101 |
| 6,990,484 B1 | 1/2006 | Ghazal et al. | |
| 7,080,062 B1 * | 7/2006 | Leung et al. | 707/2 |
| 2002/0049700 A1 | 4/2002 | Couch et al. | 707/1 |
| 2002/0087518 A1 | 7/2002 | Ellis et al. | 707/2 |
| 2003/0009446 A1 | 1/2003 | Agarwal et al. | 707/2 |
| 2003/0065648 A1 | 4/2003 | Driesch, Jr. et al. | 707/2 |
| 2003/0177137 A1 | 9/2003 | MacLeod et al. | |
| 2003/0182276 A1 | 9/2003 | Bossman et al. | 707/3 |
| 2006/0149695 A1 | 7/2006 | Bossman et al. | |

OTHER PUBLICATIONS

A. Shibamiya et al., "DB2 Cost Formula," May 1992, International Business Machines (IBM) Technical Disclosure Bulletin (TDB), Publication No. 12, pp. 389-394.

J.M. Cheng et al., "Multiple Indexed Access Path in a Relational Database System," Mar. 1990, International Business Machines (IBM) Technical Disclosure Bulletin (TDB), Publication No. 10b, pp. 388-392.

M.M. Astrahan et al., "Access Path Selection in a Relational Database Management System," Sep. 1979, International Business Machines (IBM) Technical Disclosure Bulletin (TDB), pp. 1657-1660.

Microsoft Corp., "Creating and Maintaining Databases. Statistical Information," pp. 1-3 retreived on Sep. 2, 2003 from http://msdn.microsoft.com/library/en-us/createdb/cm_8_des_o5_72r9.asp?frame+true.

Patrick Bossman, "Tuning SQL with Statistics" [online] Aug. 1999 [Retrieved on May 4, 2006] The IDUG Solutions Journal, Aug. 1999—vol. 6, No. 2, Retrieved from the Internet: <URL:http://arbaltxp-011870/member/journal/aug99/feature1.html> 5 pages.

Office Action mailed May 4, 2007 for U.S. Appl. No. 10/752,915, titled "Method, system, and program for statistics management", final rejection <11 pages>.

Office Action mailed Jul. 1, 2006 for U.S. Appl. No. 10/752,915, titled "Method, system, and program for statistics management", non-final rejection <8 pages>.

Office Action mailed Sep. 12, 2007 for U.S. Appl. No. 10/752,915, titled "Method, system, and program for statistics management" <12 pages>.

* cited by examiner

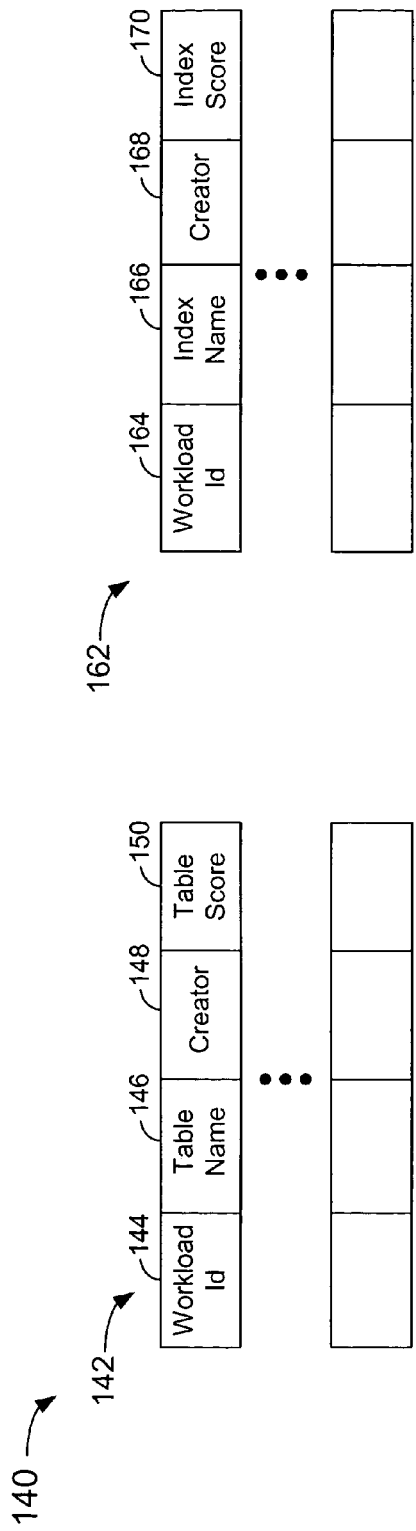

QUERY WORKLOAD STATISTICS COLLECTION IN A DATABASE MANAGEMENT SYSTEM

BACKGROUND OF THE INVENTION

1. Field of the Invention

This invention relates generally to database management systems, and more particularly to collecting statistics in database management systems.

2. Description of the Related Art

Relational database management systems allow large volumes of data to be stored and accessed efficiently and conveniently in a computer system. In a database management system, data is stored in database tables which organize the data into rows and columns. The relational database management system responds to user commands to store and access the data. To more quickly access the data in a database table, an index is generated based on one or more specified columns of the database table.

The user commands are typically Structured Query Language statements such as SELECT, INSERT, UPDATE and DELETE, to select, insert, update and delete, respectively, the data in the rows and columns. The SQL statements typically conform to a SQL standard as published by the American National Standards Institute (ANSI) or the International Standards Organization (ISO).

In some relational database management systems, a query processor receives a SQL statement. A query optimizer evaluates various alternative execution plans for the SQL statement and typically selects an execution plan having a lowest estimated cost, which may be in time, resources, or a combination thereof. The query processor executes the selected execution plan. The query optimizer uses a set of database statistics to evaluate an execution plan. The database statistics comprise information about the state of the data in the relational database management system. The relational database management system typically provides one or more tools to collect the database statistics.

In a relational database management system, timely statistics information can improve performance. INSERT, UPDATE and DELETE statements, in addition to various utilities, may change the data in the database. As the data changes in the database, the performance of the database management system may degrade because the statistics do not reflect the current state of the database. Hence, the amount of time to process queries may increase. Therefore, database administrators periodically re-collect the database statistics.

Database administrators typically collect nominal database statistics, such as single column cardinality, on all tables, columns of the tables and indexes. Collecting database statistics on all tables, columns and indexes can consume a large amount of time. However, database administrators typically do not have the time and/or expertise to analyze the queries to determine what columns and column groups are most important and what database statistics would be most beneficial to improve performance.

Sometimes database statistics are collected for columns which have not been referenced in any SQL statement. When columns are not used as predicates or aggregates within a SQL statement, statistics on those columns are useless. Collecting database statistics that are not used wastes both processor and storage resources and consumes a large amount of processor time. Processor time is expensive and it is very expensive to spend valuable processor time collecting statistics rather than running business applications. Indeed, the expense of collecting database statistics for all columns and indexes often results in re-collecting statistics less frequently than is otherwise desirable to maintain desirable performance levels.

Various statistics collection tools examine the real-time statistics to trigger re-collection. For example, one statistics collection tool examines the growth in table size to trigger re-collection. If the table grows by, for example, fifteen percent, then database statistics are recollected. Another statistics collection tool monitors the number of INSERT, UPDATE and DELETE statements that were performed on the table. If the number of INSERT, UPDATE and DELETE statements exceeds a threshold, then recollecting database statistics is recommended. Some statistics collection tools examine the system throughput and schedule database statistics re-collection at off-peak times with a very low scheduling priority. However, these statistics collection tools do not address what statistics to collect, and the statistics re-collection can remain both inefficient because the re-collection consumes a large amount of time and ineffective because the re-collection may not be performed sufficiently often to reflect the state of the database.

Therefore, there is a need for an improved technique for statistics collection in a database management system.

SUMMARY OF THE INVENTION

To overcome the limitations in the prior art described above, and to overcome other limitations that will become apparent upon reading and understanding the present specification, various embodiments of a method, apparatus, and article of manufacture for collecting statistics are provided.

In one embodiment, statistics are collected in a database management system. A workload comprising a plurality of database queries is received. Query statistics for the database queries are identified. The query statistics for the database queries are consolidated to provide consolidated statistics. One or more statistics collection tasks are generated based on the consolidated statistics.

In another embodiment, the database management system also comprises one or more collection objects. Statistics collection tasks are generated for the respective collection objects. In yet another embodiment, the collection objects are table spaces.

In this way, an improved technique for collecting statistics in a database management system has been provided.

BRIEF DESCRIPTION OF THE DRAWINGS

The teachings of various embodiments of the present invention can be readily understood by considering the following detailed description in conjunction with the accompanying drawings, in which:

FIGS. 6A, 6B, 6C, 6D and 6E collectively depict an embodiment of a consolidated statistics repository comprising an embodiment of a table-score table, index-score table, column table, column value table and column-group-score table, respectively, used by the consolidation module of FIG. 1;

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to collect statistics. In various embodiments, statistics are collected in a database management system. A workload comprising a plurality of database queries is received. Query statistics for the database queries are identified. The query statistics for the database queries are consolidated to provide consolidated query statistics. One or more statistics collection tasks are generated based on the consolidated query statistics.

In another embodiment, the database management system also comprises one or more collection objects. Statistics collection tasks are generated for the respective collection objects based on the consolidated statistics. In yet another embodiment, the collection objects are table spaces.

Figure 1:
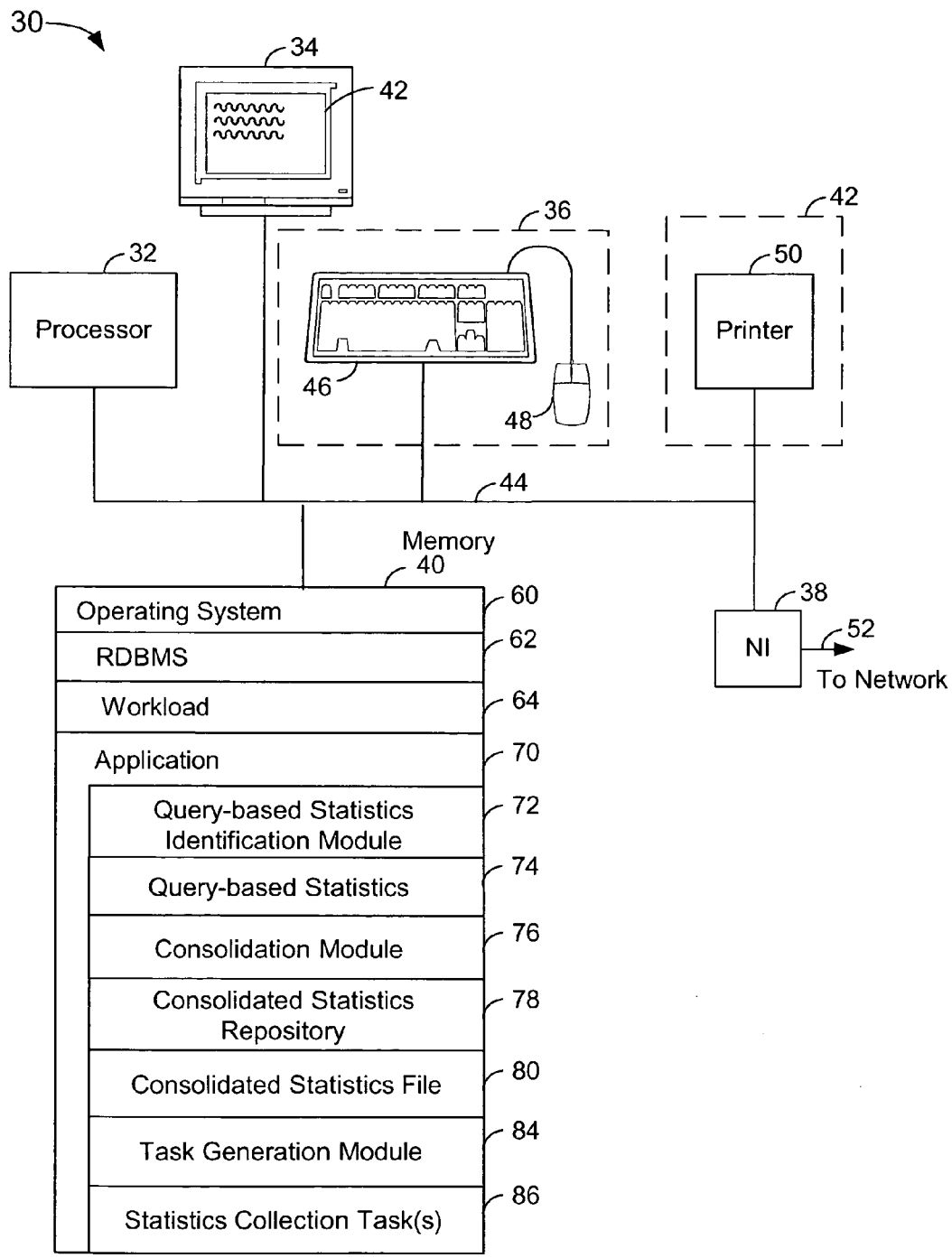
FIG. 1 depicts an illustrative computer system which uses various embodiments of the present invention.

FIG. 1 depicts an illustrative computer system which uses various embodiments of the present invention. The computer system 30 comprises a processor 32, display 34, input interfaces (I/F) 36, communications interface 38, memory 40 and output interface(s) 42, all conventionally coupled by one or more buses 44. The input interfaces 36 comprise a keyboard 46 and mouse 48. The output interface 42 is a printer 50. The communications interface 38 is a network interface (NI) that allows the computer 30 to communicate via a network, such as the Internet. The communications interface 38 may be coupled to a transmission medium 52 such as, for example, twisted pair, coaxial cable or fiber optic cable. In another exemplary embodiment, the communications interface 38 provides a wireless interface, that is, the communications interface 38 uses a wireless transmission medium.

The memory 40 generally comprises different modalities, illustratively semiconductor memory, such as random access memory (RAM), and disk drives. In some embodiments, the memory 40 stores an operating system 60, a relational database management system (RDBMS) 62, a workload 64 and an application 70.

The workload 64 comprises a set of queries. In various embodiments, the term "query" refers to SQL select statements. In various other embodiments, the term "query" refers to searched updates, searched deletes and inserts with subselects, in addition to SQL select statements. In some embodiments, the term "query" refers to SQL select, insert, delete and update statements. In various embodiments, at least a subset of the queries of the workload are different from each other.

The application 70 comprises a query-based statistics identification module 72 which provides query-based statistics 74 for the queries of the workload. In various embodiments, the query-based statistics 74 comprise at least a subset of the table names, column names and column groups referenced in a query and at least a subset of the names of the indexes that are candidates for access. If a table, column or column group is not referenced by any query in a workload, that table, column or column group, respectively, is not part of the query-based statistics. A consolidation module 76 receives and consolidates the query-based statistics 74 to produce consolidated statistics which are stored, at least in part, in a consolidated statistics repository 78. In various embodiments, the consolidation module 76 also generates a score for the tables, columns, column groups, and in some embodiments, the indexes, of the query-based statistics and stores the scores as part of the consolidated statistics in the consolidated statistics repository 78. In some embodiments, the consolidation module generates a consolidated statistics file 80 which contains information, comprising the scores, for a workload from the consolidated statistics repository grouped by collection objects. A task generation module 84 receives the consolidated statistics file 80 and generates one or more statistics collection tasks 86.

In some embodiments, the RDBMS 62 is stored on one or more disk drives. In other embodiments, the RDBMS 62, or portions of the RDBMS 62, may be stored remotely from the application 70 on another computer system and is accessed via the network.

Typically, the specific software instructions, data structures and data that implement various embodiments of the present inventive technique are incorporated in the application 70. Generally, an embodiment of the present invention is tangibly embodied in a computer-readable medium, for example, the memory 40 and is comprised of instructions which, when executed by the processor 32, cause the computer system 30 to utilize the embodiment of the present invention. The memory 40 may store a portion of the software instructions, data structures and data for any of the operating system 60, application 70 and RDBMS 62 in semiconductor memory, while other portions of the software instructions and data are stored in disk memory.

The operating system 60 may be implemented by any conventional operating system, such as z/OS® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation) and LINUX® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over a network. The article of manufacture in which the code is implemented also encompasses transmission media, such as a network transmission line and wireless transmission media. Thus the article of manufacture may also comprise the medium in which the code is embedded. Those skilled in the art will recognize that many modifications may be made to this configuration without departing from the scope of the present invention.

The exemplary computer system illustrated in FIG. 1 is not intended to limit the present invention. Other alternative hardware environments may be used without departing from the scope of the present invention.

Figure 2:
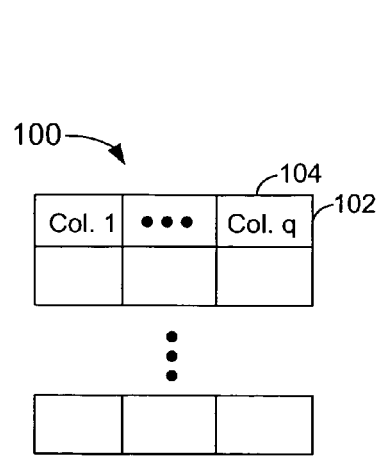
FIG. 2 depicts an exemplary table having rows and columns of the database management system of FIG. 1.

FIG. 2 depicts an exemplary table 100 of the RDBMS 62 of FIG. 1. The table 100 has rows 102 and columns 104. In some embodiments, one or more columns are designated as a key that is used to access the rows of the table; and an index is created based on the key. An index also comprises rows and columns, similar to a table. A table may be associated with one or more indexes. In a query, a column group is formed from a set of related predicates. For example, consider the following query of tables T1 and T2:

SELECT*FROM T1, T2,
WHERE T1.C1=T2.C1 AND T1.C2=T2.C2 and T1.C3=5 AND T1.C4>6.

In the query, columns C1, C2, C3 and C4 of table T1 are referenced and columns C1 and C2 of table T2 are referenced. For table T1, there is one join-predicate-related column group (C1, C2) which is determined by two join predicates T1.C1=T2.C1 and T1.C2=T2.C2, and one local-predicate-related column group (C3, C4) which is determined by two local predicates T1.C3=5 AND T1.C4>6.

Figure 3:
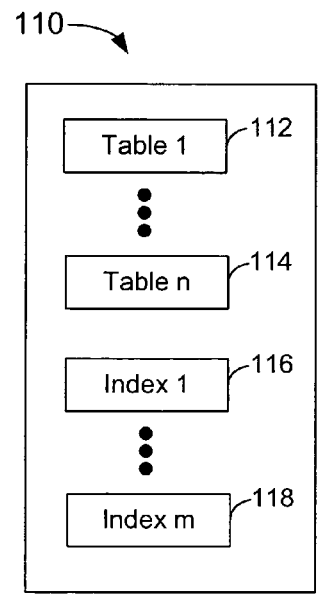
FIG. 3 depicts an embodiment of a collection object of the database management system of FIG. 1.

FIG. 3 depicts an embodiment of a collection object 110 having one or more tables 112-114 of the RDBMS 62 of FIG. 1. In some embodiments, the collection object 110 also comprises indexes 116-118. In various embodiments, the collection object 110 is a table space. However, the present invention is not meant to be limited to table spaces, and may be used with other collection objects. The RDBMS 62 (FIG. 1) comprises one or more collection objects 110.

Figure 4:
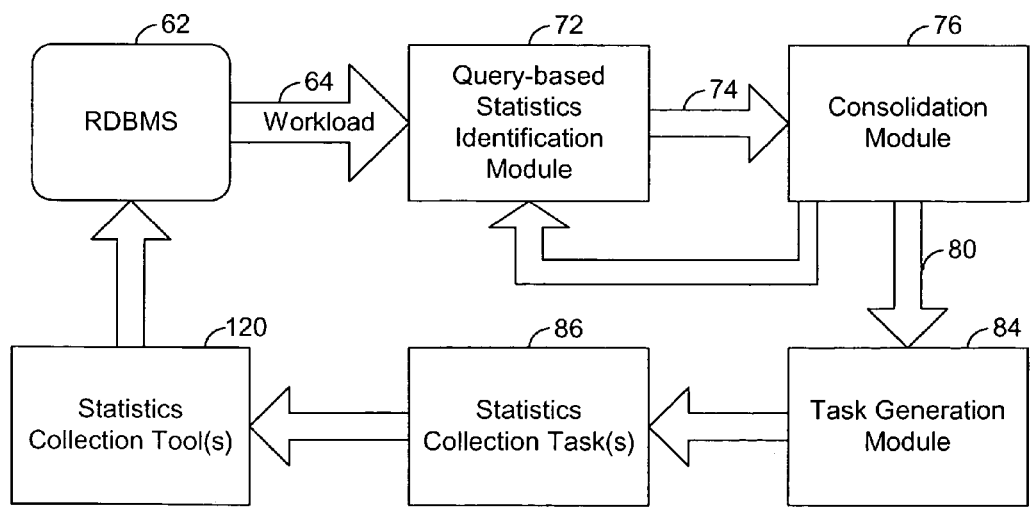
FIG. 4 depicts a high-level block diagram of an embodiment of consolidating query-based statistics for a workload and generating at least one statistics collection task using the query-based statistics identification module, the consolidation module, and the task generation module of FIG. 1.

FIG. 4 depicts a high-level block diagram of an embodiment of consolidating query-based statistics for a workload and generating at least one statistics collection task using the query-based statistics identification module, the consolidation module, and the task generation module of FIG. 1. The application 70 (FIG. 1) receives a workload 64 comprising queries which are, or can be, executed by the RDBMS 62. In the application 70 (FIG. 1). the query-based statistics identification module 72 is invoked for each query of the workload 64. The query-based statistics identification module 72 identifies query-based statistics for each query and provides the query-based statistics 74 for each query to the consolidation module 76. Statistics identification has been described in U.S. patent application Ser. No. 10/752,915, titled "Method, System, and Program for Statistics Management." filed on Jan. 7, 2004, to Patrick Dooling Bossman, You-Chin Fuh and Chan-Hua Liu (International Business Machines (IBM), which is incorporated herein by reference in its entirety. In various embodiments, the query-based statistics identification module 72 implements various techniques for statistics identification described in U.S. patent application Ser. No. 10/752,915, titled "Method, System, and Program for Statistics Management," filed on Jan. 7, 2004, to Patrick Dooling Bossman, You-Chin Fuh and Chan-Hua Liu (IBM).

The consolidation module 76 consolidates the query-based statistics 74 for the queries in the workload to produce consolidated statistics which are stored in the consolidated statistics repository 78 (FIG. 1). In various embodiments, the consolidated statistics comprise scores associated with the tables identified in the query-based statistics for the workload, scores associated with the columns and column groups identified in the query-based statistics for the workload, and scores associated with the indexes in the query-based statistics. In some embodiments, the scores for the identified tables, columns and column groups are based on a number of times those tables, columns and column groups are referenced by the queries in the workload. In various embodiments, the scores for the indexes are based on a number of times that the indexes identified in the query-based statistics for the workload are a candidate for access. In various embodiments, all indexes are candidates for access. In some embodiments, the consolidation module also generates a consolidated statistics file 80 with the consolidated statistics, comprising the scores, for a workload.

The task generation module 84 receives the consolidated statistics. In some embodiments, the task generation module 84 receives the consolidated statistics for a workload from the consolidated statistics file 80. The task generation module 84 generates one or more statistics collection tasks 86 based on the consolidated statistics. In some embodiments, the statistics collection tasks 86 are suggestions. A database administrator may execute all or a portion of the statistics collection tasks 86. Alternately, the statistics collection tasks 86 are executed automatically. In various embodiments, for a DB2 database management system, the statistics collection tasks 86 are RUNSTATS or DSTATS statements. However, the statistics collection tasks 86 can be of other forms and the various embodiments of the present invention may be applied to other database management systems and tools.

In various embodiments, one or more of the statistics collection tasks 86 are automatically executed, in some embodiments, by the statistics collection tools 120, to update the database statistics.

Figure 5:
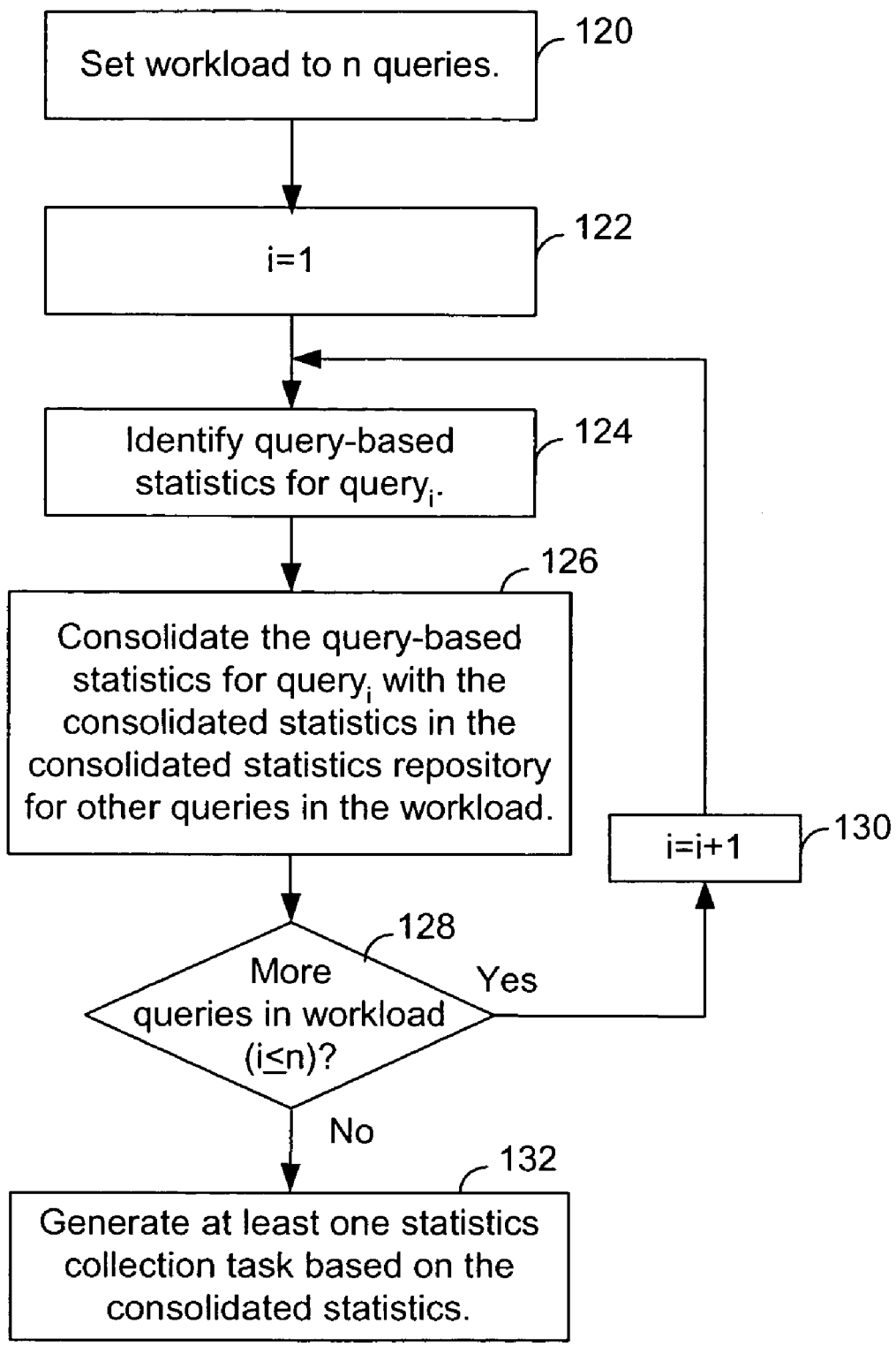
FIG. 5 depicts a flowchart of an embodiment of the operation of the query-based statistics identification module, the consolidation module and the task generation module of FIG. 1.

FIG. 5 depicts a flowchart of an embodiment of the operation of the application 70 of FIG. 1. In step 120, a workload having n queries is received. In step 122, a counter i is set equal to one. In step 124, query-based statistics are identified for query$_i$. In step 126, the consolidation module consolidates the query-based statistics for query$_i$ with the consolidated statistics in the consolidated statistics repository from other queries in the workload to provide updated consolidated statistics, and stores the updated consolidated statistics in the consolidated statistics repository. In various embodiments, the consolidation module also generates scores based on the query-based statistics, and stores the scores in the consolidated statistics repository as part of the consolidated statistics. Step 128 determines if there are more queries in the workload, that is, if i is less than or equal to n, if so, step 128 proceeds to step 130 to increment the counter i. Step 130 proceeds to step 124 to process the next query in the workload.

When, in step 128, the application determines that all queries in the workload have been processed. in step 132, at least one statistics collection task is generated based on the consolidated statistics, and in various embodiments, the scores.

FIGS. 6A, 6B, 6C, 6D and 6E collectively depict an embodiment of a consolidated statistics repository 140 comprising an embodiment of a table-score table, index-score table, column table, column value table and column-group-score table, respectively, used by the consolidation module 76 of FIG. 1. In some embodiments, the consolidated statistics repository 140 is implemented using tables in the RDBMS. In other embodiments, the consolidated statistics repository 140 is implemented using one or more files.

FIG. 6A depicts a diagram of an embodiment of a table-score table 142. In various embodiments, the table-score table 142 comprises a workload identifier (Workload Id) 144, the name of the table (Table Name) 146, the name of the creator (Creator) 148 of the table and a table score (Table Score) 150. The workload identifier 144 uniquely identifies the workload. In some embodiments, the name of the creator 148 of the table is used in combination with the table name 146 to uniquely identify a table. In other embodiments, a name of a schema is used, rather than the name of the creator, in combination with the table name to uniquely identify a table. In yet other embodiments, the table name 146 is sufficient to uniquely identify a table. The table score 150 refers to the number of references to the table. The table score 150 will be described in further detail below.

FIG. 6B depicts a diagram of an embodiment of an index-score table 162. The index-score table 162 comprises a workload identifier 164, the name of the index 166, the name of the creator of the index 168 and an index score (Index Score) 170. In some embodiments, the name of the creator 169 is used in combination with the index name 166 to uniquely identify an index. In other embodiments, a name of a schema is used, rather than the name of the creator, in combination with the table name to uniquely identify an index. In yet other embodiments, the index name 166 is sufficient to uniquely identify an index. The index score 170 will be described in further detail below.

FIG. 6C depicts a diagram of an embodiment of a column table 176. The column table 176 stores predicate-related information. The column table 176 comprises a workload identifier (Workload Id) 178, the name of the table (Table Name) 180 associated with the column, the name of the creator (Creator) 182 of the table, the name of the column (Column Name) 184, the column number of the column (Column Number) 186, a column identifier (COL_ID) 188 to identify the column, a first marker score (First Marker Score) 190, a second marker score (Second Marker Score) 192, a blank score (Blank Score) 194 and a null score (Null Score) 195. The first marker score 190, the second marker score 192, the blank score 194, and the null score 195 will be described in further detail below. In an alternate embodiment, the column table 176 comprises the column name 184 and at least one or any combination of the first marker score 190, the second marker score 192, the blank score 194, and the null score 195.

Figure 6D:
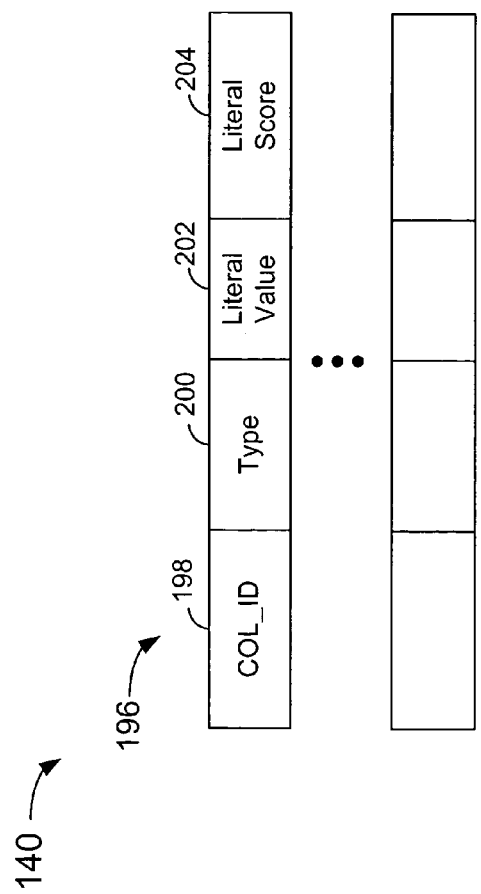

FIG. 6D depicts a diagram of an embodiment of a column value table 196. The column value table 196 also stores predicate related information. The column value table stores information for a column if there are local equal or range predicates such as "Column op Literal." The column value table comprises, for at least a subset of the columns of the queries of the workload, a column identifier (COL_ID) 198, a type (Type) 200, a literal value (Literal Value) 202 and a literal score (Literal Score) 204. The column value table 196 is associated with the column table 176 based on the column identifier (COL_ID) 198. The column identifier 198 serves as a parent key in the parent-child relationship of the column table 176 (FIG. 6C) and the column value table 196. A column may be associated with multiple column identifiers since multiple predicates of the form "Column op Literal", may occur. The literal score 204 will be described in further detail below. In some embodiments, the column value table 196 is omitted.

Figure 6E:
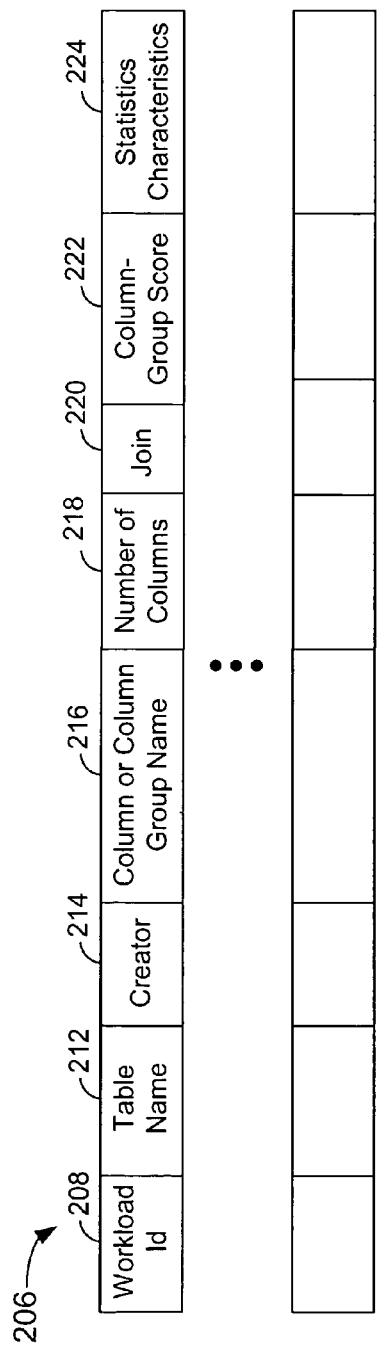

FIG. 6E depicts a diagram of an embodiment of a column-group-score table 206. The column-group-score table 206 comprises a workload identifier (Workload ID) 208, the table name (Table Name) 212 associated with the column group, the name of the creator (Creator) 214 of the table associated with the column or column group, the column or column group column name 216 (Column or Column Group Name) and the number of columns 218 of the column group, whether the column or column group was referenced in a join (Join) 220, a column or column-group score (Column-Group Score) 222, and statistics characteristics (Statistics Characteristics) 224. The column-group score will be described in further detail below. In various embodiments, the statistics characteristics 224 may comprise one or more columns, and indicate the type of statistics that will be collected for the column or column group. For example, the statistics characteristics may indicate that uniform and/or non-uniform statistics may be collected for a column or column group. In some embodiments, the uniform statistics comprise cardinality. In various embodiments, the non-uniform statistics comprise frequency and/or histogram information. In some embodiments, the creator 214 column is omitted because a table can be uniquely identified from the table name 212. Alternately, the name of a schema is used, rather than the creator 214, in combination with the table name 212 to uniquely identify a table. In another alternate embodiment, the column-group-score table 206 comprises the table name 212, the column or column group name 216 and the column-group score 222. In another embodiment, the column-group-score table 206 comprises the table name 212, the column group name 216, the column-group score 222 and the statistics characteristics 224.

Figure 7A:
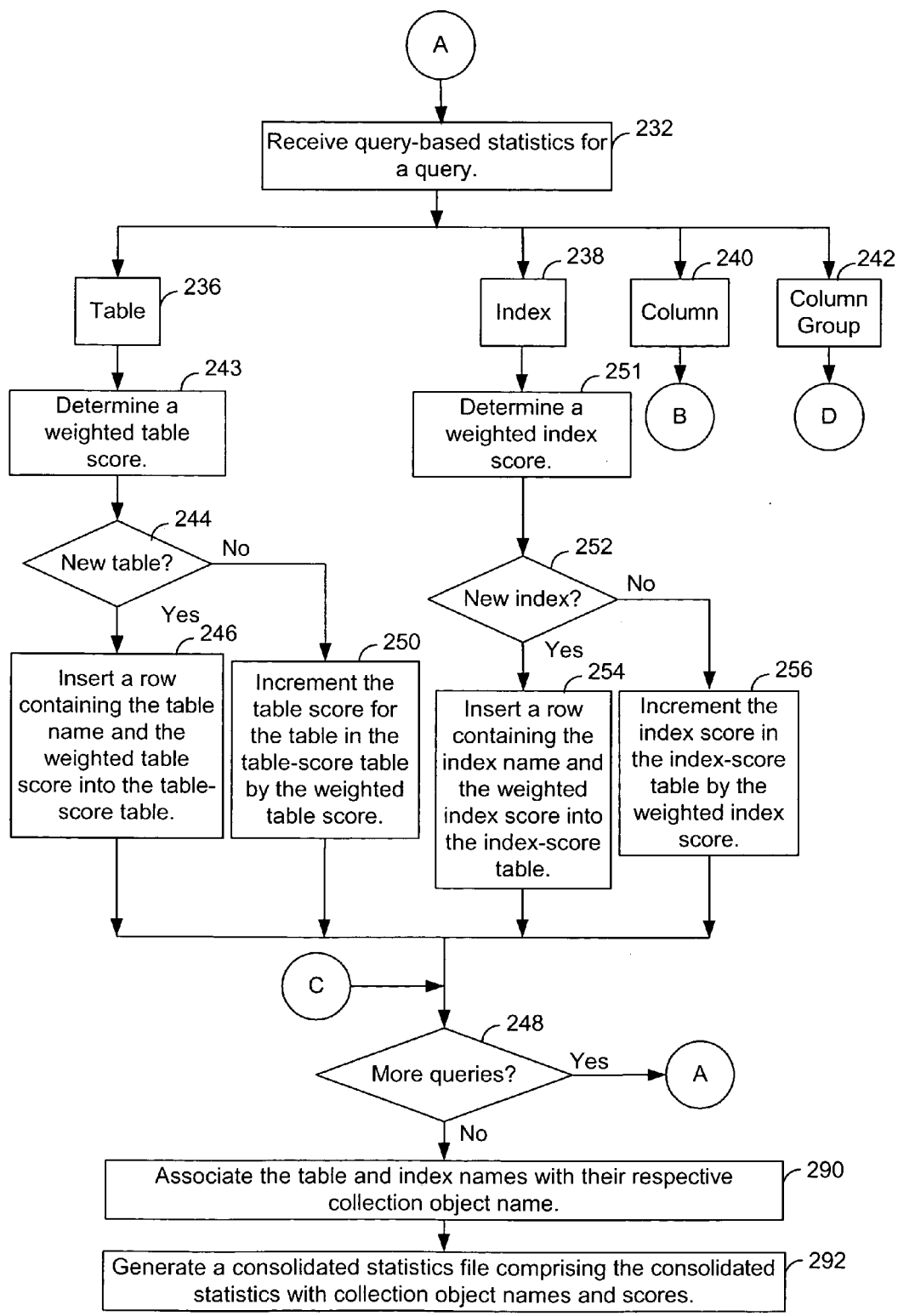
FIGS. 7A, 7B and 7C collectively depict a more-detailed flowchart of an embodiment of the consolidation of query-based statistics used in various embodiments of the consolidation module of FIG. 1.
Figure 7B:
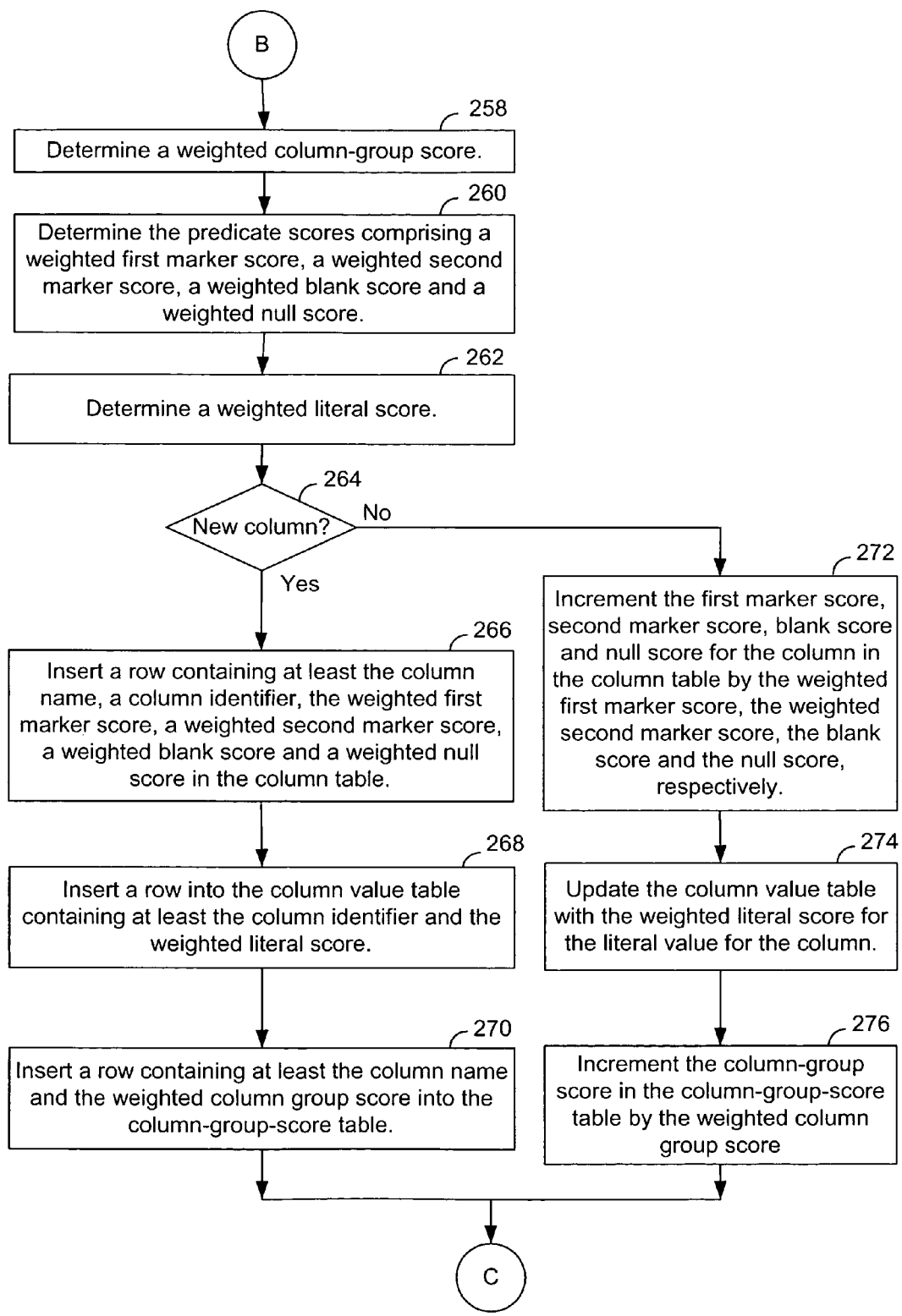
Figure 7C:
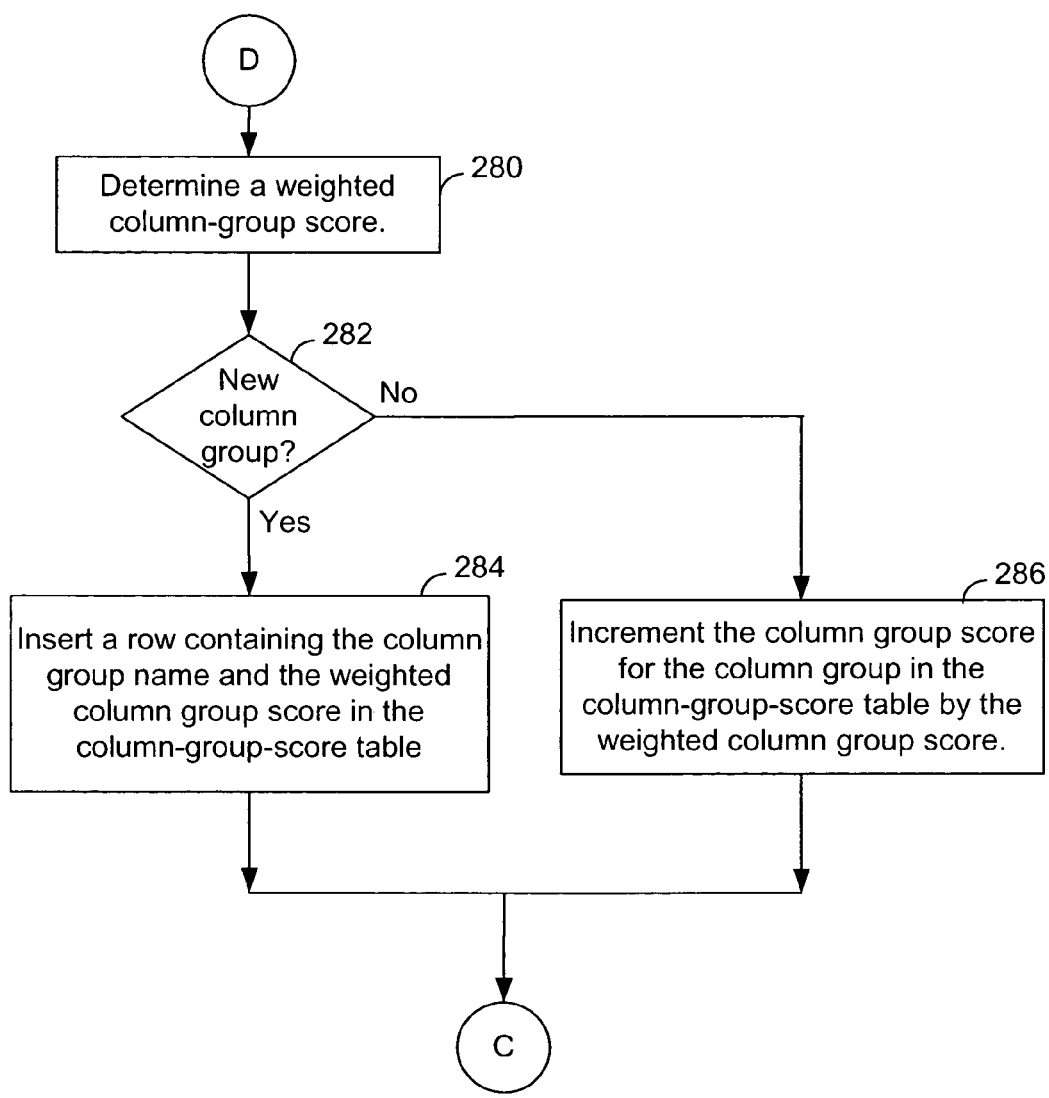

FIGS. 7A, 7B and 7C collectively depict a more-detailed flowchart of an embodiment of the consolidation of the query-based statistics of the consolidation module of FIG. 1. Typically, the consolidated statistics for various workloads are stored in the consolidated statistics repository. The workload identifier is used to distinguish the consolidated statistics for different workloads.

The query-based statistics identification module may not provide the names of all tables, columns and column groups referenced in a query in the query-based statistics. In various embodiments, the query-based statistics identification module provides the names of a subset of tables referenced in a query. In other embodiments, the query-based statistics identification module provides the names of all tables referenced in a query. In some embodiments, not all columns and column groups referenced in a query are included in the query-based statistics from the query-based statistics identification module. In various embodiments, the query-based statistics comprise those columns and column groups which are referenced by some predicates whose filter factors can be reasonably estimated by the query optimizer, given sufficient statistics. In an alternate embodiment, all columns and column groups referenced in a query are included in the query-based statistics. Alternately, the query-based statistics identification module provides the names of all columns and column groups referenced in a query. In yet other embodiments, the query-based statistics identification module provides the names of a subset of indexes that are a candidate for access in a query in the query-based statistics. Alternately, the query-based statistics identification module provides the names all of the indexes that are a candidate for access in a query in the query-based statistics. In some embodiments, all indexes are candidates for access.

In various embodiments, as described above, the consolidated statistics repository stores scores for the tables, indexes, columns and column groups. The scores are used to prioritize the collection of query-based statistics. In some embodiments, the scores are based on the number of references for the tables, columns and column groups, a number of times that an index is a candidate for access, a number of executions of the query, and, in some embodiments, a cost of the query. For example, a query which is executed one million times with a low query cost can have a high score because it is executed many times.

In step 232, query-based statistics are received for a query from the workload. In various embodiments, the query-based statistics comprise a workload identifier, one or more table names, the creators of the tables, the creators of the indexes, single-query-table counts of a number of references to the respective tables in the query, zero or more index names for respective indexes and associated single-query-index counts of a number of times that an index is a candidate for access in the query. The query-based statistics may further comprise zero or more column names, associated column numbers, and associated single-query-column counts. When the query comprises certain predicates, as will be further described below, the query-based statistics may further comprise at least one or any combination of a first marker count, a second marker count, a blank count, and a null count. Alternately, the first marker count, the second marker count, the blank count, and the null count are omitted. The query-based statistics may also comprise for certain predicates of the form, "Column (op) literal", a type which is the operation (op), the literal value, and a literal count. In other embodiments, the query-based statistics comprise certain predicates, or alternatively, an indicator associated with that predicate, and an associated count of a number of references to that predicate in the query. The query-based statistics may also comprise a join indicator, a single-query column count, and, in some embodiments, statistics characteristics for the column. Alternately, the join indicator is omitted. The query-based statistics may further comprise zero or more column group names, the number of columns in a column group, a join indicator, a single-query column group count, and, in some embodiments, statistics characteristics for the column groups. Alternately, the query-based statistics do not provide column numbers; and the column numbers are provided by the database management system. In other alternate embodiments, the creator is omitted. In another embodiment, the workload identifier is omitted. In yet another alternate embodiment, the statistics characteristics are omitted.

In various embodiments, a number of occurrences of the query is also provided in the query-based statistics. When a query from a workload is received, a value representing a number of occurrences of that query is also received. The number of occurrences of the query refers to a number of executions of that query during a predetermined period of time. For example, an inventory control system can generate daily, monthly, and quarterly reports via queries q1, q2 and q1. During the year, query q1 will be executed 365 times, query q2 will be executed twelve times, and query q3 will be executed four times. Therefore, the number of occurrences for queries q1, q2 and q3 are 365, twelve and four, respectively. In various embodiments, the scores of the various tables of the repository are weighted by the number of occurrences of the query. For example, if a table is referenced once for query q1, the associated the table score for that table will be incremented by 365, rather than one. In other embodiments, the number of occurrences of the query is not used.

In some embodiments, a database administrator can choose if estimated costs are to be included in the scores in the consolidated statistics repository. In other embodiments, estimated costs are automatically included in the various scores in the repository. In an environment in which database statistics are collected frequently, the estimated cost is more reliable than in environments in which database statistics are collected less frequently. In other embodiments, the estimated costs are omitted. The estimated cost of a query may be provided by the query optimizer.

As indicated by blocks, 236, 238, 240 and 242, the consolidation module updates the consolidated statistics repository with at least one and any combination of the following query-based statistics associated with a query: table, index, column and column group, respectively. Although the flowchart shows that the consolidating is performed concurrently, in other embodiments, the query-based statistics for the table(s), index(es), column group(s) and column(s) are consolidated sequentially.

As indicated by block 236, the query-based statistics comprise, in various embodiments, a table name, workload identifier, the name of the creator of the table, and a single-query-table count. The single-query-table count represents the number of references to the table name for the query.

When consolidating query-based statistics for a table (block 236), in step 243, a weighted table score is determined. In various embodiments, the weighted table score is set equal to the product of the single-query-table count and the number of occurrences of the query. In other embodiments, the weighted table score is set equal to the product of the single-query-table count, the number of occurrences of the query and an estimated cost of the query. In some embodiments, the weighted table score is set equal to the single-query-table count.

Step 244 determines whether the table is a new, that is whether, the table name is not stored in the table-score table 142 (FIG. 6A) of the consolidated statistics repository 140 (FIG. 6A). In some embodiments, the table-score table 142 (FIG. 6A) is searched for the table name that is provided in the query-based statistics. When a row containing the table name is not found, the table is determined to be new. Alternately, the table-score table 142 (FIG. 6A) is searched for the workload identifier, table name, and creator that are provided in the query-based statistics. When a row containing the workload identifier, table name, and creator is not found, the table is determined to be new.

When, in step 244, the table is determined to be new, in some embodiments, in step 246, a row containing that table name and the weighted table score is inserted into the table-score table 142 (FIG. 6A). The table name is stored in the table name column 146 (FIG. 6A) and the weighted table score is stored in the table score column 150 (FIG. 6A) of the row. In other embodiments, in step 246, the workload identifier, table name, and creator from the query-based statistics, and the weighted table score are inserted into the workload identifier 144 (FIG. 6A), table name 146 (FIG. 6A), creator 148 (FIG. 6A) and table score 150 (FIG. 6A), respectively, of a row of the table-score table. The query-based statistics may refer to more than one table for a query. Therefore, for a single query, one or more rows may be inserted into the table-score table of the consolidated statistics repository, depending on the number of references to different tables in the query. Each table will be associated with its own weighted table score.

After the table, index, column and column group statistics for the query are consolidated into the consolidated statistics repository, step 248 determines whether more queries in the workload are to be processed, if so, step 248 proceeds, via continuator A, to step 232 to receive the query-based statistics for the next query in the workload.

When step 244 determines that the table is not new, a row for that table has been found in the table-score table. In step

250, the table score for that row in the table-score table is incremented by the weighted table score. Step 250 proceeds to step 248. In an alternate embodiment, when the query-based statistics contain a plurality of table names and associated single-query-table counts, steps 243, 244 and one of steps 246 and 250 are repeated for each table name prior to proceeding to step 248.

As indicated by block 238, the query-based statistics may also comprise the index name, the creator of the index and a single-query-index count of a number of times the index is a candidate for access for a table.

When the query-based statistics comprise an index name, in step 251, a weighted index score is determined for that index name. The weighted index score is set equal to the product of the number of occurrences of the query and the single-query-index count. In another embodiment, the weighted index score is set equal to the product of the number of occurrences of the query, the single-query-index count and the estimated cost of the query. In another alternate embodiment, the weighted index score is set equal to the single-query-index count.

Step 252 determines whether the index is new, that is, whether the index name is new. In some embodiments, when the index name is not in the index-score table of the repository, that index name is determined to be new. In other embodiments, when the workload identifier, index name and creator are not in a row of the index-score table, that index name is determined to be new.

When step 252 determines that the index is new, in step 254, a row containing the index name and the weighted index score is inserted into the index-score table. The index name is stored in the index name column 166 (FIG. 6B) and the weighted index score is stored in the index score column 170 (FIG. 6B) of the index-score table. In some embodiments, in step 254, a row containing the workload identifier, index name, creator and weighted index score is inserted into the index-score table. The workload identifier is stored in the workload identifier column 164 (FIG. 6B). The index name is stored in the index name column 166 (FIG. 6B). The creator is stored in the creator column 168 (FIG. 6B); and the weighted index score is stored in the index score column 170 (FIG. 6B). Step 254 proceeds to step 248.

When step 252 determines that the index is not new, the index name is in a row of the index-score table. In some embodiments, the workload identifier and creator in addition to the index name are in the row of the index-score table. In step 256, the index score of that row in the index-score table is incremented by the weighted index score. Step 254 proceeds to step 248. In an alternate embodiment, when the query-based statistics contain a plurality of index names and associated single-query-index counts, steps 251, 252 and one of steps 254 and 256 are repeated for each index name prior to proceeding to step 248.

The query-based statistics may contain information for zero or more columns. When the query-based statistics have column information, as indicated by block 240, the flowchart proceeds via continuator B to step 258 of FIG. 7B.

In step 258, a weighted column-group score for the column is determined. Because the column-group-score table 206 (FIG. 6E) is used to store information for both columns and column groups, the weighted column-group score is used for both single columns and column groups. In various embodiments, the weighted column group score is set equal to the product of the single-query-column count and the number of occurrences of the query. In some embodiments, the weighted column group score is set equal to the product of the single-query-column count, the number of occurrences of the query and the estimated cost of the query. In another embodiment, the weighted column group score is set equal to the single-query-column count.

In some embodiments, a weighting factor is also applied to provide the weighted column group score. In some embodiments, the query-based statistics further comprise a local-equal indicator that is set to a first state when a local equal equal predicate has a literal in the right hand side of the predicate, is otherwise set to a second state. In one embodiment, the weighting factor is equal to 2.0 for join predicates, that is, when the join indicator of the query-based statistics indicates that the column was referenced in a join operation, and when local equal predicates have a literal in the right hand side of the predicate, as indicated when the local-equal indicator is in the first state, for example, the predicate is of the form "Column=Literal". In various embodiments, the query-based statistics further comprise a marker indicator which is set to a first state when a host variable, parameter marker, or special register is used in the query, otherwise the marker indicator is set to a second state. The weighting factor is set equal to 1.5 when the marker indicator is set to the first state. The weighting factor is equal to 1.0 otherwise. In other embodiments, different values for the weighting factor are used. In some embodiments, the weighted column group score is multiplied by the appropriate weighting factor. In other embodiments, the weighted column group score is set equal to the product of the single-query-column count, the number of occurrences of the query, and the weighting factor. In some embodiments, the weighted column group score is set equal to the product of the single-query-column count, the number of occurrences of the query, the estimated cost of the query, and the weighting factor. In other embodiments, the weighted column group score is set equal to the product of the single-query-column count and the weighting factor.

In step 260, predicate scores are determined. The predicate scores comprise a weighted first marker score, a weighted second marker score, a weighted blank score and a weighted null score. In some embodiments, the query-based statistics may provide various counts associated with certain predefined predicates, when those predicates occur in a query. In various embodiments, predicate scores are determined from those predicate counts and stored in the column table.

A weighted first marker score is set equal to the product of the number of occurrences of the query and the first marker count. The first marker count represents a number of references to the column in a "Column=?" predicate in the query. The question mark "?" in the predicate refers to a parameter marker which represents a position in a dynamic SQL statement where the application will provide a value. In other embodiments, the weighted first marker score is set equal to the product of the number of occurrences of the query, the estimated cost of the query, and the first marker count. In other alternate embodiments, the weighted first marker score is set equal to the first marker count.

A weighted second marker score is set equal to the product of the number of occurrences of the query and the second marker count. The second marker count represents the number of references to the column in a "Column op ?" predicate in the query, where "op" is an operator such as=, >, <, >=, <=, <>, and "between." In other embodiments, the weighted second marker score is set equal to the product of the number of occurrences of the query, the estimated cost of the query, and the second marker count. In other alternate embodiments, the weighted second marker score is set equal to the second marker count.

A weighted blank score is set equal to the product of the number of occurrences of the query and the blank count. The blank count represents the number of references to the column in a "Column='"' predicate in the query. In other embodiments, the weighted blank score is set equal to the product of the number of occurrences of the query, the estimated cost of the query, and the blank count. In other alternate embodiments, the weighted blank score is set equal to the blank count.

A weighted null score is set equal to the product of the number of occurrences of the query and the null count. The null count represents the number of references to the column in a "Column IS NULL" predicate in the query. In other embodiments, the weighted null score is set equal to the product of the number of occurrences of the query and the null count. In other alternate embodiments, the weighted null score is set equal to the null count.

In step 262, a weighted literal score is determined. In various embodiments, the weighted literal score is determined if a predicate is of the form "Column op literal", where op is an operator such as=, >, <, >=, <=, <> and between, a weighted literal score is determined. In some embodiments, when the join indicator does not indicate "join", and the marker indicator is set to the second state, a predicate of the form "Column op literal" has been identified in the query-based statistics. The query-based statistics may also provide a single-query-literal count, a type, that is, the operation (op), and the associated literal. The single-query-literal count is the number of times that the literal is referenced in the "Column op Literal" predicate of the query for the column. In various embodiments, the weighted literal score is set equal to the single-query-literal count. In some embodiments, the weighted literal score is the product of the single-query-literal count, and the number of occurrences of the query to provide a weighted literal score. In some other embodiments, the weighted literal score is the product of the single-query-literal count, the number of occurrences of the query and the estimated cost of the query.

Step 264 determines whether the column is new. In some embodiments, the column-group-score table 206 (FIG. 6E) is searched for a matching column name in the column or column group name column, and when the column name is not found, the column is not new. Alternately, step 264 searches the column-group-score table 206 (FIG. 6E) for a matching workload identifier, table name, creator and column name, and when not found, that column is determined to be new. In another alternate embodiment, the column table 176 (FIG. 6C) is searched, rather than the column-group-score table 206 (FIG. 6E).

When step 264 determines that a column is new, the column table 176 (FIG. 6C) is updated. In step 266, in various embodiments, the column name and the weighted first marker score, the weighted second marker score, the weighted blank score and the weighted null score are inserted into a row of the column table 176 (FIG. 6C). In some embodiments, each column is associated with at least one unique column identifier. The application generates the column identifier. In various embodiments, the workload identifier, table name, creator, column name, column number, column identifier, weighted first marker score, weighted second marker score, weighted blank score and weighted null score are inserted into the workload identifier 178 (FIG. 6C), table name 180 (FIG. 6C), creator 182 (FIG. 6C), column name 184 (FIG. 6C), column identifier 188 (FIG. 6C), first marker score 190 (FIG. 6C), second marker score 192 (FIG. 6C), blank score 194 (FIG. 6C) and null score 195 (FIG. 6C), respectively, of a row of the column table 176 (FIG. 6C).

In step 268, a row containing at least the column identifier and weighted literal score is inserted into the column value table 196 (FIG. 6D) for a column. In other embodiments, a row containing the column identifier, the type, the literal value and the weighted literal score is inserted into the column identifier column 198 (FIG. 6D), type column 200 (FIG. 6D), literal value column 202 (FIG. 6D) and literal score column 204 (FIG. 6D), respectively, of the column value table for the column. In the query-based statistics, when multiple literal values are referenced for a column in the query, the column identifier may be associated with various literal values and may therefore be associated with multiple rows in the column value table, at least one row for each literal value.

In step 270, a row is inserted into the column-group-score table 206 (FIG. 6E). In some embodiments, the row contains at least the column name and the weighted column-group score. In other embodiments, the workload identifier, table name, creator, column name, a number of columns equal to one, an indicator of whether the column is referenced in a join in the query, the weighted column group score, and statistics characteristics are stored in the workload identifier 208 (FIG. 6E), table name 212 (FIG. 6E), creator 214 (FIG. 6E), column or column group name 216 (FIG. 6E), number of columns 218 (FIG. 6E), join 220 (FIG. 6E), column-group score 222 (FIG. 6E) and statistics characteristics 224 (FIG. 6E), respectively, in a row of the column-group-score table 206 (FIG. 6E). Step 270 proceeds, via continuator C, to step 248 of FIG. 7A.

When, in step 264, the column is not new, the column is associated with a row in at least the column and column-group-score tables, 176 (FIG. 6C) and 206 (FIG. 6E), respectively. In various embodiments, at least one of the column, column value and column-group-score tables, 176 (FIG. 6C), 196 (FIG. 6D) and 206 (FIG. 6E), respectively, are updated. In step 272, in some embodiments, zero or more, or any combination of the first marker score 190 (FIG. 6C), second marker score 192 (FIG. 6C), and blank score 194 (FIG. 6C) and null score 195 (FIG. 6C) in the associated row in the column table 176 (FIG. 6C) are incremented by the weighted first marker score, the weighted second marker score, the weighted blank score and the weighted null score, respectively.

In step 274, the column value table 196 (FIG. 6D) is updated based on the column identifier of the column table when a predicate has a literal value, that is, when the predicate is "Column op Literal". The appropriate row of the column value table 196 (FIG. 6D) having the same column identifier, type and literal value as a predicate in a query is found. The literal score 204 (FIG. 6D) for that row is incremented by the weighted literal score. Alternately, if a row having the same column identifier, type and literal value is not found, a new row is inserted.

In step 276, the column-group-score table 206 (FIG. 6E) is updated. The row associated with the table name and column, or alternatively, the workload identifier, predicate, table name, creator and column, is identified. The column-group score 222 (FIG. 6E) of the identified row is incremented by the weighted column group score for the column. When any column is associated with a join, the join column 222 (FIG. 6E) is set to indicate that the column is associated with a join operation. In addition the statistics characteristics are updated such that, when the query-based statistics indicate that non-uniform statistics were generated for that column, then the statistics characteristics are set to indicate that non-uniform statistics will be generated for that column; otherwise uniform statistics will be generated. Step 276 proceeds, via continuator C, to step 248 of FIG. 7A.

Alternately, when the query-based statistics comprise a plurality of column names, in various embodiments, steps 258-264, and one of the groups of steps 266-270 and 272-276 are repeated for each column name. In another alternate embodiment, the column value table is omitted, and steps 262, 268 and 274 are omitted. In yet another alternate embodiment, the column table is omitted, and steps 260, 266 and 272 are omitted.

When the query-based statistics comprise information for a column group as indicated by block 242, the flowchart proceeds via continuator D to step 280 of FIG. 7C. In various embodiments, the query-based statistics comprise a workload identifier, table name, creator, column group, number of columns in the column group, and a single-query-column-group count. The single-query column group count contains the number of references to a column group in the predicate.

In step 280, a weighted column group score is determined. In various embodiments, the weighted column group score is set equal to the product of the single-query-column group count and the number of occurrences of the query. In some embodiments, the weighted column group score is set equal to the product of the single-query-column group count, the number of occurrences of the query and the estimated cost of the query. In another embodiment, the weighted column group score is set equal to the single-query-column group count. The weighting factor that was described above with respect to step 258 for columns may also be applied to the scores for column groups. In various embodiments, the weighted column group score is set equal to the product of the single-query-column group count, the number of occurrences of the query, the estimated cost of the query, and the weighting factor. In some embodiments, the weighted column group score is set equal to the product of the single-query-column group count, the number of occurrences of the query, and the weighting factor. In some embodiments, the weighted column group score is set equal to the product of the single-query-column group count and the weighting factor.

Step 282 determines whether the column group is a new column group. In some embodiments, column-group-score table 206 (FIG. 6E) is searched for a matching column group name, and when not found, the column group is determined to be a new column group. Alternately, step 282 searches the column-group-score table 206 (FIG. 6E) for a row containing a matching workload identifier, table name, creator and column group name, and when not found, that column group is determined to be a new column group.

When step 282 determines that a column group is new, in step 284, a row containing at least the column group name and weighted column group score is inserted into the column-group-score table 206 (FIG. 6E). In some embodiments, the workload identifier, table name, creator, column group name, the number of columns in the column group, an indicator of whether the column group is referenced in a join in the query, the weighted column group score, and statistics characteristics are stored in the workload identifier 208 (FIG. 6E), table name 212 (FIG. 6E), creator 214 (FIG. 6E), column or column group name 216 (FIG. 6E), number of columns 218 (FIG. 6E), column-group score 222 (FIG. 6E) and statistics characteristics 224 (FIG. 6E), respectively, in a row of the column-group-score table 206 (FIG. 6E). Step 284 proceeds to step 248.

When, in step 282, the column group name is not new, in step 286, the column-group score 222 (FIG. 6E) for that column group in the column-group-score table 206 (FIG. 6E) is incremented by the weighted column group score. Step 286 proceeds to step 248. Alternately, when the query-based statistics comprise information for a plurality of column groups, steps 280, 282 and one of steps 284 and 286 may be repeated for each column group.

When step 248 determines that the queries of the workload have been processed, a row of the table-score table 150 (FIG. 6A) contains, in the table score column 170 (FIG. 6B), a value representing the score for the table. The index-score table contains, in the index score column 170 (FIG. 6B), a value representing the score for the index. In the column-group-score table, the column-group score column 222 (FIG. 6E) contains a value representing the score for the column or column group. In various embodiments, the column table 176 (FIG. 6C) contains a first marker score 190 (FIG. 6C), second marker score 192 (FIG. 6C), blank score 194 (FIG. 6C) and null score 195 (FIG. 6C) for the columns. In some embodiments, the column value table 196 (FIG. 6D) contains one or more values representing respective literal scores for some columns of the column table 176 (FIG. 6C).

In various embodiments, collection object names are not stored in the consolidated statistics repository because the collection object names can be identified based on the table and index names by accessing a database management system catalog. In some embodiments, collection object names are also stored in the consolidated statistics repository.

In step 290, the consolidation module 76 (FIG. 1) associates the table and index names of the consolidated statistics with collection object names. In some embodiments, the association between collection object names and the table and index names is stored in the system catalog. In some alternate embodiments, the collection object names are stored in the table-score and index-score tables in the consolidated statistics repository.

In various embodiments, in step 292, the consolidation module 76 (FIG. 1) generates a consolidated statistics file 80 (FIG. 1) that comprises the consolidated statistics for a workload, the associated collection object names and various scores. The consolidated statistics file comprises for each collection object associated with the tables and indexes of the workload, the names of the tables and, in some embodiments, the creator of the tables, and their respective table scores, and the name of the indexes, if any, and, in some embodiments, their creator, and their respective index scores. The consolidated statistics file also comprises, for each collection object, the name of each column and column group, and the score for the column or column group, that is, from the column-group score 222 (FIG. 6E), and, in some embodiments, the statistics characteristics for the columns and column groups. The statistics characteristics are determined from the statistics characteristics 224 (FIG. 6E) for the columns and column groups of the column-group-score table 206 (FIG. 6E). The statistics characteristics may comprise one or more indicators that uniform and/or non-uniform statistics are to be requested in a statistics collection task for that column or column group. Uniform statistics, as indicated by a uniform statistics indicator, typically comprise cardinality statistics for a column or column group. In various embodiments, depending on the database management system, a non-uniform statistics indicator may indicate that frequency statistics are to be collected for that column or column group, and/or that histogram statistics are to be collected for that column or column group. In addition, the file contains, for each table, the name of each column in each column group that was queried, the score for the column group, and an indicator of the type of statistics to be collected for that column group.

In other embodiments, the score for the column provided in the consolidated statistics file is equal to the sum of the column-group score for that column and at least one or any combination of the first marker score, the second marker score, the blank score, the null score, and the literal score(s) for that column.

In some embodiments, the consolidated statistics file 80 (FIG. 1) is implemented as an XML file. In other embodiments, other types of files may be used. In yet other embodiments, a set of application programming interface calls are provided so that the desired statistics may be retrieved from the consolidated statistics repository. In another alternate embodiment, the task generation module 84 (FIG. 1) accesses the consolidated statistics repository directly, rather than receiving the consolidated statistics file. In this embodiment, steps 290 and 292 are implemented in the task generation module 84 (FIG. 1). In another embodiment, step 292 is omitted.

In other embodiments, indexes are omitted. In some embodiments, when statistics on indexes are collected, the associated statistics will contain a single column or column group—at which point those columns are dependent on both the table and the index.

Figure 8A:
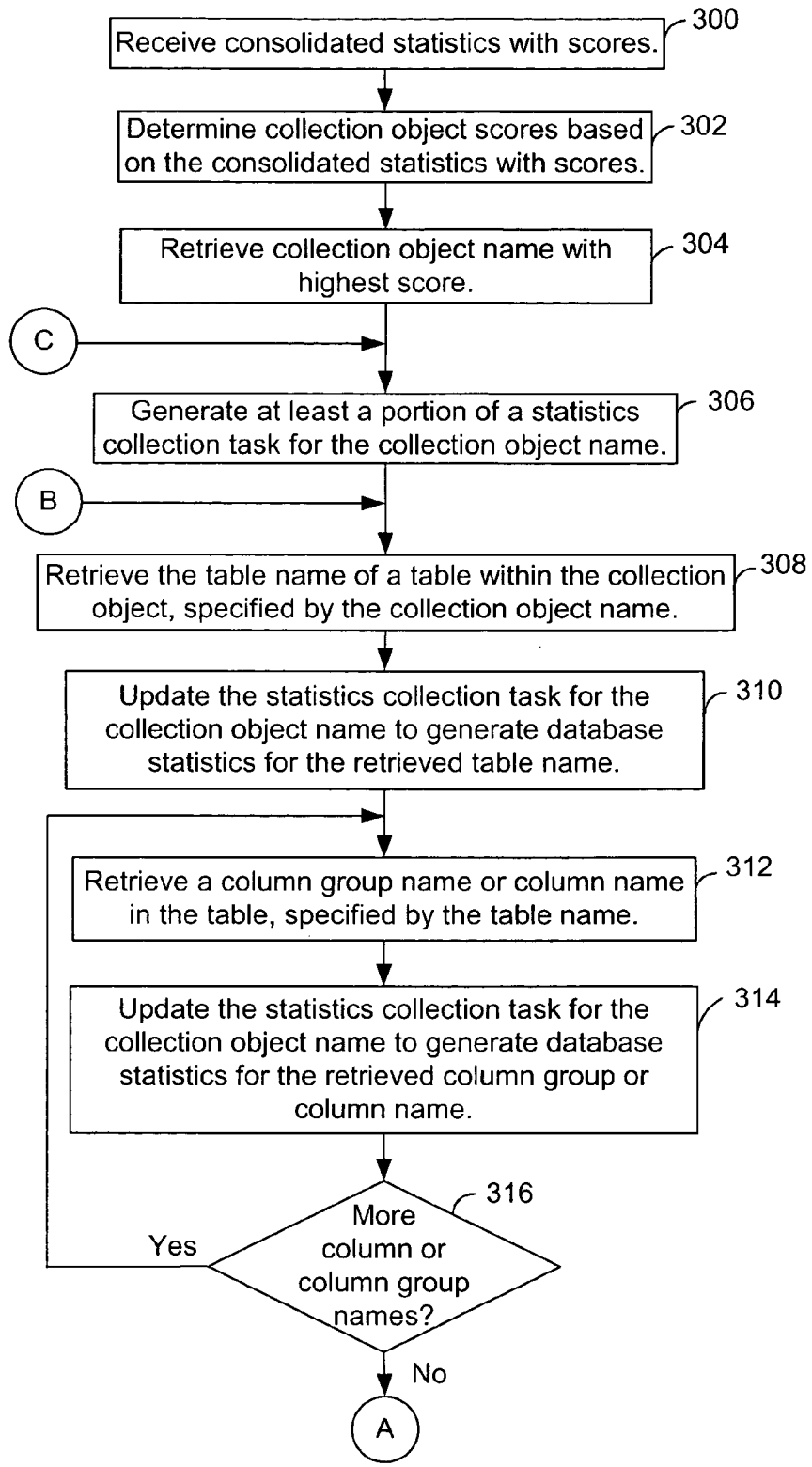
FIGS. 8A and 8B collectively depict a more-detailed flowchart of an embodiment of the generation of one or more statistics collection tasks used in various embodiments of the task generation module of FIG. 1.
Figure 8B:
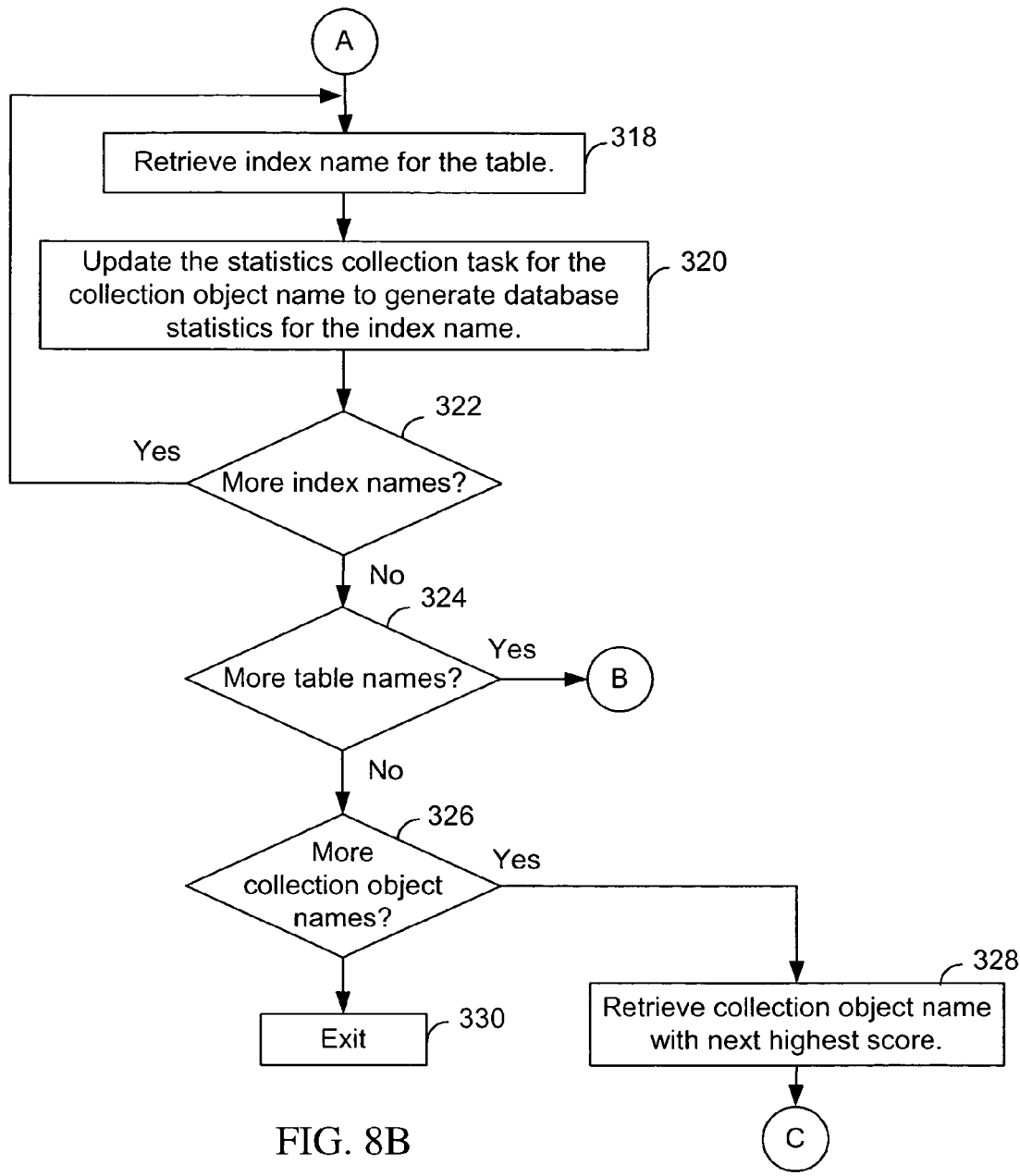

FIGS. 8A and 8B collectively depict a flowchart of an embodiment of the generation of one or more statistics collection tasks implemented in various embodiments of the task generation module 84 of FIG. 1. The task generation module 84 (FIG. 1) is invoked after the last query in the worklist has been consolidated. In step 300, in various embodiments, the task generation module 84 (FIG. 1) receives the consolidated statistics file. In other embodiments, the task generation module 84 (FIG. 1) directly accesses the consolidated statistics repository and associates the table and index names for a workload with their respective collection object names.

In step 302, collection object scores are determined based on the scores in the consolidated statistics for the workload. A collection object score is determined for each collection object name associated with the table and index names of the workload. In various embodiments, the collection object score is equal to the sum of the scores for the tables, indexes, columns and column groups in that collection object for a workload. In some embodiments, the scores for the tables, indexes, columns and column groups are provided in the consolidated statistics file. In other embodiments, the scores for the tables are found in the table score column 150 (FIG. 6A) of the table-score table 142 (FIG. 6A), the scores for the indexes are found in the index score column 170 (FIG. 6A) of the index-score table 162 (FIG. 6A), and the scores for the columns and column groups are found in the column-group scores 222 (FIG. 6E) in the column-group-score table 206 (FIG. 6E). In other embodiments, the predicate scores are included in the sum of the scores for the collection object. For example, the first marker score 190 (FIG. 6C), the second marker score 192 (FIG. 6C), the blank score 194 (FIG. 6C), the null score 195 (FIG. 6C) and the literal score 204 (FIG. 6D) are also included in the score for the associated collection object. The collection object scores may be determined in various manners, depending on the embodiment. In some embodiments, the collection object score is equal to the sum of the table scores for the tables in the collection object. In some other embodiments, the collection object score is equal to the sum of the table scores and index scores for the tables and indexes in the collection object. In other embodiments, the collection object score is equal to the sum of the table scores, index scores, and column-group scores for the tables, indexes, columns and column groups in the collection object. In yet other embodiments, the collection object score is equal to the sum of the table scores, index scores, column-group scores, and at least one or any combination of the first marker scores, second marker scores, blank scores, null scores and literal scores for the tables, indexes, columns and column groups in the collection object.

In step 304, the collection object name with the highest score is retrieved. In step 306, at least a portion of a statistics collection task is generated for the collection object. In some embodiments, for those databases in which a statistics collection task is a RUNSTATS command, the following may be generated:

RUNSTATS TABLESPACE DATABASENAME.TABLESPACENAME.

However, the invention is not limited to RUNSTATS commands and in other embodiments, portions of or other statistics collection commands may be generated.

In step 308, a table name of a table within the collection object, specified by the collection object name, is retrieved from the consolidated statistics file. In some embodiments, the table names are retrieved in accordance with their table score so that a table with a higher score is processed prior to a table with a lower score. In step 310, the statistics collection task for the collection object name is updated to generate database statistics for that table. For example, the RUNSTATS command may be as follows:

RUNSTATS TABLES PACE DATABASENAME.TABLESPACENAME

TABLE(TableOne)

In step 312, a column group name or column name for a column group or column, respectively, in the table, specified by the table name, is retrieved. In step 314, the statistics collection task for the collection object is updated to generate database statistics for the column group or column, specified the column or column group name. For example, the RUNSTATS command may be as follows:

RUNSTATS TABLESPACE DATABASENAME.TABLESPACENAME

TABLE(TableOne)

COLUMN(ColOne)

In various embodiments, the statistics collection task is generated with a request to generate uniform and/or non-uniform statistics in accordance with the statistics type indicators for the column or column group. Typically uniform statistics are requested in the statistics collection task for columns and column groups. In some embodiments, the consolidated statistics file contains one or more statistics characteristics that indicate whether uniform and/or non-uniform statistics are to be generated for the column or column group. Alternately, the task generation module 84 (FIG. 1) retrieves the statistics characteristics 224 (FIG. 6E) in the column-group-score table 206 (FIG. 6E) for the column or column group. The statistics collection task is generated in accordance with the statistics characteristics for the column or column group.

Step 316 determines if there are more column or column group names listed in the consolidated statistics file that are associated with the collection object for which to generate statistics. If so, the task generation module proceeds to step 312 to process another column or column group name.

When step 316 determines that no more columns or column group names are to be processed for the table, step 316 proceeds via continuator A to step 318 of FIG. 8B. In step 318, an index name for the table is retrieved. In step 320, the statistics collection task for the collection object is updated to generate database statistics for the index. In various embodiments, the statistics collection task requests uniform statistics, such as multi-column cardinalities, on the indexed columns. Step 322 determines if there are more index names associated with the table to add to the statistics collection task. If so, step 322 proceeds to step 318 to process another index name.

When step 322 determines that all index names for the table name have been added to the statistics collection task, the flowchart proceeds to step 324. Step 324 determines if there are more table names in the collection object, specified by the collection object name, to process. If so, step 324 proceeds, via continuator B, to step 308 of FIG. 8B to process another table name. When step 324 determines that the statistics collection task comprises each table name in the consolidated statistics file for the collection object name, in other words, that all table names in the consolidated statistics file for the collection object have been processed, step 326 determines if there are more collection object names associated with any table names in the consolidated statistics file. If so, in step 328, the collection object name with the next highest score is retrieved, and step 328 proceeds, via continuator C, to step 306 of FIG. 8A, to generate a statistics collection task for that collection object name. When step 326 determines that a statistics collection task has been generated for each collection object containing the table names in the file, in step 330, one or more database statistics tasks have been generated and the processing ends.

In this way, a set of statistics collection tasks in priority sequence in accordance with their score is provided. A higher score indicates a higher priority. A database administer may execute the entire set of statistics collection tasks, or a portion of the statistics collection tasks.

In some embodiments, after step 312, if a column or column group, specified by the column or column group name, respectively, is a prefix of an index, step 314 is modified to also generate an index portion of the statistics collection task to collect the statistics for that column or column group using an index. For example, suppose, for a table t1 in a table space ts1, there are two indexes: index i1 comprises columns c1, c5 and c6, and index i2 comprises columns c3, c4 and c5. In addition, database statistics for index i1 and column cardinality statistics for columns c1 and c2, and multi-column cardinality statistics for columns c3 and c4 are to be collected. The RUNSTATS command that is generated by collecting the column and column group statistics in an index portion of the statistics collection task, in the embodiment in which step 314 is modified to generate an index portion of the statistics collection task, is as follows:

RUNSTATS TABLESPACE ts1
   TABLE(t1) COLUMN (c2, c4)
   INDEX (i1, i2 KEYCARD)

In embodiments that use RUNSTATS, the term "KEYCARD" is added when the index has more columns than the column or column group for which the RUNSTATS command is being generated. The RUNSTATS command that would otherwise be generated by collecting the column and column group statistics in a table portion of the statistics collection task, in the embodiment in which step 314 is not modified, is as follows:

RUNSTATS TABLESPACE ts1
   TABLE(t1) COLUMN (c1, c2, c4)
   COLGROUP (c3, c4)
   INDEX (i1)

The prefixes of an index (c1, c2, c3, . . . , cn) are the column groups (c1), (c1,c2), (c1,c2,c3), (c1,c2,c3, c4), . . . (c1, c2, . . . , cn). In the above example, column c1 is the prefix of index i1, and columns c3 and c4 are the prefix of index i2. In various embodiments, index information contains the columns and the order of columns; and, in some embodiments, the index information can be found in catalog tables. When RUNSTATS collects index statistics, RUNSTATS collects the first and the last cardinality of the prefixes (c1), (c1, c2, . . . , cn). If a KEYCARD keyword is supplied in the RUNSTATS command, then the cardinality for the other prefixes will also be collected. Collecting statistics on INDEX is more efficient than collecting on COLUMN and COLGROUP. In the embodiment in which step 314 is modified to generate an index portion of a statistics collection task, step 320 of FIG. 8B is also modified to check for an existing index portion of the statistics collection task, and if the index portion exists, then adds additional indexes to the existing index portion.

Various embodiments for determining scores for the tables, indexes, columns, column groups and collection objects have been described. However, other techniques for determining the scores for the tables, indexes, columns, column groups and collection objects may be used by the consolidation module and/or task generation module.

The foregoing description of the preferred embodiments of the inventions has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. A computer-implemented method of collecting statistics in a database management system comprising a plurality of collection objects having a plurality of tables, at least one particular collection object of the plurality of collection objects comprising a plurality of particular tables of the plurality of tables, comprising:

receiving a workload comprising a plurality of database queries referencing the plurality of tables, at least two of the database queries that are different referencing a same table of the plurality of tables;

for each database query of the plurality of database queries of the workload:

identifying query statistics for said each database query of the plurality of database queries, the query statistics comprising a number of references to at least one table of said each database query and a number of occurrences of said each database query; and consolidating, for said each database query, the query statistics to provide consolidated statistics comprising at least one cumulative table score for said at least one table, respectively, wherein said at least one cumulative table score for said at least one table is based on a previous at least one cumulative table score, if any, for said at least one table and a product of the number of references to said at least one table of said each database query and the number of occurrences of said each database query; and generating a plurality of statistics collection tasks to collect database statistics to be used by an optimizer based on the consolidated statistics, the plurality of statistics collection tasks to collect the database statistics on the plurality of tables referenced by the plurality of database queries of the workload, the plurality of statistics collection tasks being based on a plurality of collection objects comprising the plurality of tables referenced by the plurality of database queries of the workload, a plurality of collection object scores are determined for the plurality of collection objects comprising the plurality of tables referenced by the plurality of database queries of the workload, each collection object score for each collection object is based on said at least one cumulative table score for said at least one table of said each collection object, wherein the plurality of statistics collection tasks are ordered based on the plurality of collection object scores.

2. The method of claim 1 wherein the collection objects are table spaces.

3. The method of claim 1 wherein the a least one cumulative table score is also based on, at least in part, a cost of the database queries referencing said at least one table.

4. The method of claim 1 wherein the query statistics comprise column information, and when a column specified in the column information is part of an index, generating an index portion of at least one statistics collection task to collect database statistics for that column.

5. The method of claim 1 wherein the at least one cumulative table score represents a total number of references to said at least one table by the plurality of database queries of the workload.

6. The method of claim 1 wherein said query statistics further comprise a number of references to at least one index of referenced by said each database query of the workload;
wherein said consolidating, for said each database query, the query statistics to provide the consolidated statistics comprises determining at least one cumulative index score for the at least one index referenced by said each database query, respectively, the at least one cumulative index score being based on a previous at least one cumulative index score, if any, for said at least one index and a product of the number of references to said at least one index and the number of occurrences of said each database query;
wherein said generating said at least one statistics collection task also determines the collection object score for the collection object that contains any index referenced by said each database query based on the cumulative index score for that index.

7. The method of claim 1 wherein said query statistics further comprise a number of references to at least one column-group of said each query of said workload;
wherein said consolidating, for said each database query, the query statistics to provide the consolidated statistics comprises determining at Least one cumulative column-group score for the at least one column-group referenced by said each database query, respectively, said at least one cumulative column-group score being based on a previous at least one cumulative column-group score, if any, for said at least one column-group and a product of the number of references to said at least one column-group and the number of occurrences of said each database query; and
wherein said generating said at least one statistics collection task also determines the collection object score for the collection object that contains any table comprising any column-group referenced by said each database query based on the cumulative column-group score for that column-group.

8. The method of claim 1 wherein said query statistics further comprise a number of references to at least one column of said each query of said workload;
wherein said consolidating, for said each database query, the query statistics to provide the consolidated statistics comprises determining at least one cumulative column-group score for the at least one column referenced by said each database query, respectively, said at least one cumulative column score being based on a previous at least one cumulative column score, if any, for said at least one column and a product of the number of references to said at least one column and the number of occurrences of said each database query; and
wherein said generating said at least one statistics collection task also determines the collection object score for the collection object that contains any table comprising any column referenced by said each database query based on the cumulative column score for that column.

9. An article of manufacture comprising a computer usable storage medium embodying one or more instructions executable by a computer for performing a method of collecting statistics in a database management system comprising a plurality of collection objects having a plurality of tables, at least one particular collection object of the plurality of collection objects comprising a plurality of particular tables of said plurality of tables, the method comprising:
receiving a workload comprising a plurality of database queries referencing the plurality of tables, at least two of the database queries that are different referencing a same table of the plurality of tables;
for each database query of the plurality of database queries of the workload:
identifying query statistics for said each database query of the of plurality of database queries, the query statistics comprising a number of references to at least one table of said each database query and a number of occurrences of said each database query; and
consolidating, for said each database query, the query statistics to provide consolidated statistics comprising at least one cumulative table score for said at least one table, respectively, wherein said at least one cumulative table score for said at least one table is based on a previous at least one cumulative table score, if any, for said at least one table and a product of the number of references to said at least one table of said each database query and the number of occurrences of said each database query; and
generating a plurality of statistics collection tasks to collect database statistics to be used by an optimizer based on the consolidated statistics, the plurality of statistics collection tasks to collect the database statistics on the plurality of tables referenced by the plurality of database queries of the workload, the plurality of statistics collection tasks being based on a plurality of collection objects comprising the plurality of tables referenced by the plurality of database queries of the workload, a plurality of collection object scores are determined for the plurality of collection objects comprising the plurality of tables referenced by the plurality of database queries of the workload, each collection object score for each collection object is based on said at least one cumulative table score for said at least one table of said each collection object, wherein the plurality of statistics collection tasks are ordered based on the plurality of collection object scores.

10. The article of manufacture of claim 9 wherein the collection objects are table spaces.

11. The article of manufacture of claim 9 wherein the at least one cumulative table score is also based on, at least in part, a cost of the database queries referencing said at least one table.

12. The article of manufacture of claim 9 wherein the query statistics comprise column information, and when a column specified in the column information is part of an index, generating an index portion of at least one statistics collection task to collect database statistics for that column.

13. The article of manufacture of claim 9 wherein the at least one cumulative table score represents a total number of references to said at least one table by the plurality of database queries of the workload.

14. The article of manufacture of claim 9 wherein said query statistics further comprise a number of references to at least one index of referenced by said each database query of the workload;
wherein said consolidating, for said each database query, the query statistics to provide the consolidated statistics comprises determining at least one cumulative index score for the at least one index referenced by said each database query, respectively, the at least one cumulative index score being based on a previous at least one cumulative index score, if any, for said at least one index and a product of the number of references to said at least one index and the number of occurrences of said each database query;
wherein said generating said at least one statistics collection task also determines the collection object score for the collection object that contains any index referenced by said each database query based on the cumulative index score for that index.

15. The article of manufacture of claim 9 wherein said query statistics further comprise a number of references to at least one column-group of said each query of said workload;
wherein said consolidating, for said each database query, the query statistics to provide the consolidated statistics comprises determining at least one cumulative column-group score for the at least one column-group referenced by said each database query, respectively, said at least one cumulative column-group score being based on a previous at least one cumulative column-group score, if any, for said at least one column-group and a product of the number of references to said at least one column-group and the number of occurrences of said each database query; and
wherein said generating said at least one statistics collection task also determines the collection object score for the collection object that contains any table comprising any column-group referenced by said each database query based on the cumulative column-group score for that column-group.

16. The article of manufacture of claim 9 wherein said query statistics further comprise a number of references to at least one column of said each query of said workload;
wherein said consolidating, for said each database query, the query statistics to provide the consolidated statistics comprises determining at least one cumulative column-group score for the at least one column referenced by said each database query, respectively, said at least one cumulative column score being based on a previous at least one cumulative column score, if any, for said at least one column and a product of the number of references to said at least one column and the number of occurrences of said each database query; and
wherein said generating said at least one statistics collection task also determines the collection object score for the collection object that contains any table comprising any column referenced by said each database query based on the cumulative column score for that column.

17. An apparatus for collecting statistics in a database management system comprising a plurality of collection objects having a plurality of tables, at least one particular collection object of the plurality of collection objects comprising a plurality of particular tables of the plurality of tables, comprising:
a processor; and
a memory storing one or more instructions that:
receive a workload comprising a plurality of database queries referencing the plurality of tables, at least two of the database queries that are different referencing a same table of the plurality of tables;
for each database query of the plurality of database queries of the workload:
identify query statistics for said each database query of the plurality of database queries, the query statistics comprising a number of references to at least one table of said each database query and a number of occurrences of said each database query; and
consolidate, for said each database query, the query statistics to provide consolidated statistics comprising at least one cumulative table score for said at least one table, respectively, wherein said at least one cumulative table score for said at least one table is based on a previous at least one cumulative table score, if any, for said at least one table and a product of the number of references to said at least one table of said each database query and the number of occurrences of said each database query; and
generate a plurality of statistics collection tasks to collect database statistics to be used by an optimizer based on the consolidated statistics, the plurality of statistics collection tasks to collect the database statistics on the plurality of tables referenced by the plurality of database queries of the workload, the plurality of statistics collection tasks being based on a plurality of collection objects comprising the plurality of tables referenced by the plurality of database queries of the workload, a plurality of collection object scores are determined for the plurality of collection objects comprising the plurality of tables referenced by the plurality of database queries of the workload, each collection object score for each collection object is based on said at least one cumulative table score for said at least one table of said each collection object, wherein the plurality of statistics collection tasks are ordered based on the plurality of collection object scores.

18. The apparatus of claim 17 wherein the collection objects are tablespaces.

19. The apparatus of claim 17 wherein said query statistics further comprise a number of references to at least one index of referenced by said each database query of the workload;
wherein said consolidating, for said each database query, the query statistics to provide the consolidated statistics comprises determining at least one cumulative index score for the at least one index referenced by said each database query, respectively, the at least one cumulative index score being based on a previous at least one cumulative index score, if any, for said at least one index and a product of the number of references to said at least one index and the number of occurrences of said each database query;

wherein said generating said at least one statistics collection task also determines the collection object score for the collection object that contains any index referenced by said each database query based on the cumulative index score for that index.

20. The apparatus of claim 17 wherein said query statistics further comprise a number of references to at least one column of said each query of said workload;

wherein said consolidating, for said each database query, the query statistics to provide the consolidated statistics comprises determining at least one cumulative column-group score for the at least one column referenced by said each database query, respectively, said at least one cumulative column score being based on a previous at least one cumulative column score, if any, for said at least one column and a product of the number of references to said at least one column and the number of occurrences of said each database query; and wherein said generating said at least one statistics collection task also determines the collection object score for the collection object that contains any table comprising any column referenced by said each database query based on the cumulative column score for that column.

* * * * *